(12) United States Patent
Sauer

(10) Patent No.: US 6,652,946 B1
(45) Date of Patent: Nov. 25, 2003

(54) LOOP FOR SUSPENDING SAUSAGES OR THE LIKE

(75) Inventor: Heinrich Sauer, Butzbach (DE)

(73) Assignee: Poly-Clip Ststem GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/031,139

(22) PCT Filed: Jun. 15, 2000

(86) PCT No.: PCT/EP00/05534

§ 371 (c)(1),
(2), (4) Date: Jul. 15, 2002

(87) PCT Pub. No.: WO01/06860

PCT Pub. Date: Feb. 1, 2001

(30) Foreign Application Priority Data

Jul. 26, 1999 (DE) .......................................... 199 34 444

(51) Int. Cl.[7] .............................................. B65D 81/34
(52) U.S. Cl. ...................... 428/40.1; 426/105; 426/410; 426/665; 428/131; 428/137; 428/192; 428/194
(58) Field of Search ................................ 428/40.1, 131, 428/137, 192, 194; 426/105, 665, 410

(56) References Cited

U.S. PATENT DOCUMENTS

| 4,227,668 A | | 10/1980 | Ernst |
| 4,426,241 A | | 1/1984 | Zimmerman et al. |
| 5,378,515 A | * | 1/1995 | Hatton ........................ 428/40.1 |
| 6,289,563 B1 | * | 9/2001 | Watkins ..................... 428/40.1 |

FOREIGN PATENT DOCUMENTS

| DE | 29 13 495 A | 10/1979 |
| EP | 0 267 871 A | 5/1988 |
| EP | 0 413 166 A | 2/1991 |

* cited by examiner

Primary Examiner—Nasser Ahmad
(74) Attorney, Agent, or Firm—Norris McLaughlin & Marcus

(57) ABSTRACT

The invention relates to a suspension loop (1) for hanging sausages or the like, which is composed of a folded strip of material having openings (5) at both ends. Once the strip has been folded, said openings are aligned with each other and can receive a locking member (8) (still in an open position) which is used to attach the end of the sausage to the suspension loop. The strip material used in the invention is advantageously made of a printable synthetic material, whereby the inventive suspension loop can serve as a labelling loop.

11 Claims, 2 Drawing Sheets

LOOP FOR SUSPENDING SAUSAGES OR THE LIKE

This is a 371 of PCT/EP00/05534 filed Jun. 15 2000 (intentionally filing date).

The invention relates to the use of a strip of tape material, which is provided at both ends with holes, as a suspension loop for sausages or the like, which loop can be fastened at a terminal sealing element of the sausage. It furthermore relates to the sealing of an end of a sausage with such a suspension loop and to a method for producing such a loop.

BACKGROUND OF THE INVENTION

Various suspension loops, which facilitate the handling, for example, of sausages during the treatment steps (boiling, smoking, etc.) that follow the filling process and, moreover, the handling during the subsequent storage, are known. At the present time, they frequently consist of endless, knotted string. When the sausage is sealed, this string can be suspended, for example in a clip, which surrounds the end of the sausage skin, which has been gathered into a pigtail (DE-A-197 00 891.7). Furthermore, dimensionally stable, plastic, injection-molded suspension loops, such as those known from DE-A-2 913 495, have become known. Along the edge of the loop, the latter have a scale, on which the production date of the sausage may be marked. The German patent 1,632,140 discloses the suspension loop, which is addressed above, in the form of a folded-over tape, which has the width of the gathered end of the sausage skin and is thickened at its ends into beads, which are intended to prevent the loop slipping out of the sealing element.

New regulations and consumer expectations not only require that the production date be given on the product itself, but also that information be provided concerning the nature of the particular product, the constituents used for its production, the manufacturer and other relevant data. For this purpose, additional label tags can be provided, which are attached to the sealing element next to the suspension loop when the sausage or the like is sealed and are suitable for being printed with the information in question. It is obvious that such a procedure is expensive and increases the risk of breakdowns during the production of sausage. The latter is also the case for the aforementioned tape-shaped suspension loop, namely when the end beads stand in the way of fastening them to the pigtail-like gathered ends of the sausage skin (as well as in the way of an immediate printing before the processing).

SUMMARY OF THE INVENTION

It is an object of the invention to counter these disadvantages of the state of the art. For this purpose, a strip of tape material is used pursuant to the invention as a suspension loop and is provided at both ends with holes, which, when the strip is folded over, lie over one another and into which the (still not yet closed) sealing element is introduced. In this way, the initially described function of a suspension loop is combined with that of a label, which can hold extensive information in a single uniform and, at the same time, simple element. Moreover, this can easily be stocked up in magazines and supplied for processing to an automatic sausage-filling system.

Strips of tape materials with terminal holes are known as covering for inscriptions on filing pins. Their size (distance between the holes) is standardized and generally too small to be used in the inventive sense; moreover, this different type of use did not suggest itself. The same thing also applies to methods for furnishing the end of the sausage (or the like) with such a suspension loop and to sealing the end of the sausage itself, which is provided with a suspension loop.

DETAILED DESCRIPTION

Advantageously, the tape material is composed of a plastic, which can be printed. It may be constructed as a multi-layer composite film.

In the interests of greater stability and a higher load-bearing capacity, the strips can be reinforced at least in the regions, surrounding the holes. In these regions, at least one of the surfaces, facing one another in the folded-over state of the strip, can be coated with a pressure-sensitive adhesive, in order to ensure that the holes are aligned when the sealing element is introduced. The pressure-sensitive coating can also function as a bonding agent for magazining on a supporting tape.

BRIEF DESCRIPTION OF THE DRAWINGS

The invention is illustrated by an example and the drawings in which.

Figure 3:
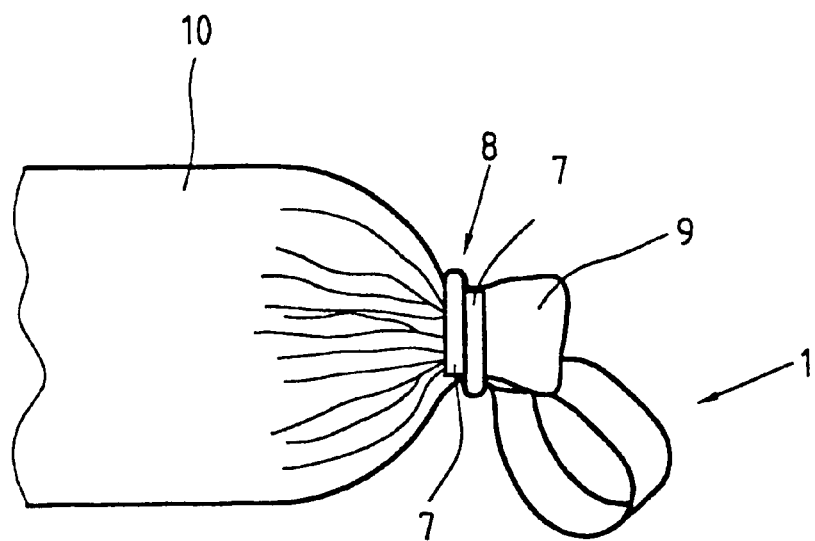
FIG. 3 shows the end of the sausage, which, after being sealed, is finally provided with an inventive label loop Each of the suspension loops 1, which are shows in FIG. 1 and, because of their double function, can also be referred to as "double loops", is composed of a tape-shaped strip of plastic. The plastic material may be multi-layered, the individual layers fulfilling the different requirements that must be met by the label loop, namely, on the one hand, accepting the printing, which is shown, by way of example in FIG. 1, and, on the other, ensuring the necessary strength of the suspension loop during the later processing (boiling, smoking, etc.) of the sausage, which was sealed by the application of the suspension loop. Each suspension loop is reinforced at both ends 3 in the region 4 and provided in each case with a hole 5.
Figure 2:
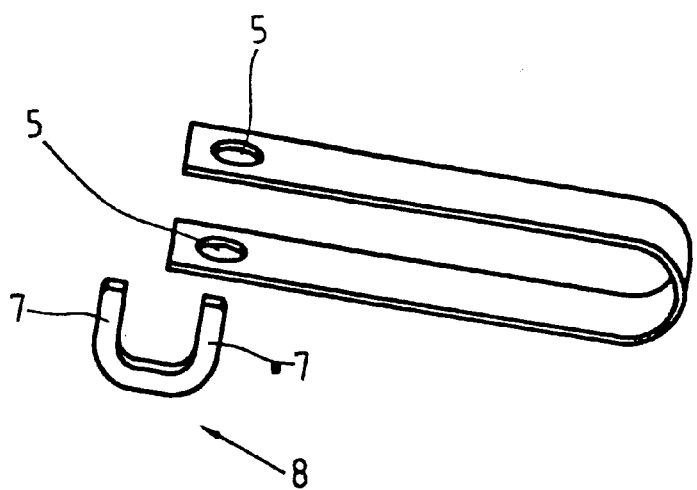
FIG. 2 shows the label loop, which is folded over into a loop and introduced with superimposed holes into a sealing element, which is not yet closed.

During the processing, the suspension loop 1 is folded over in the region of the center line 6 so that, as shown in FIG. 2, the holes 5 are aligned with one another and, after a coating with a pressure-sensitive adhesive and appropriate further approach, are glued together superimposed as the loop shown in FIG. 2. One of the legs 7 of the sealing element 8, which is shown by way of examples in FIGS. 2 and 3 and is in the form of a conventional wire clip, is then inserted in the holes 5. This is then, as shown in FIG. 3, bent about the sausage skin 10, which has been gathered into a pigtail 9 and is sealed by these means.

Figure 1:
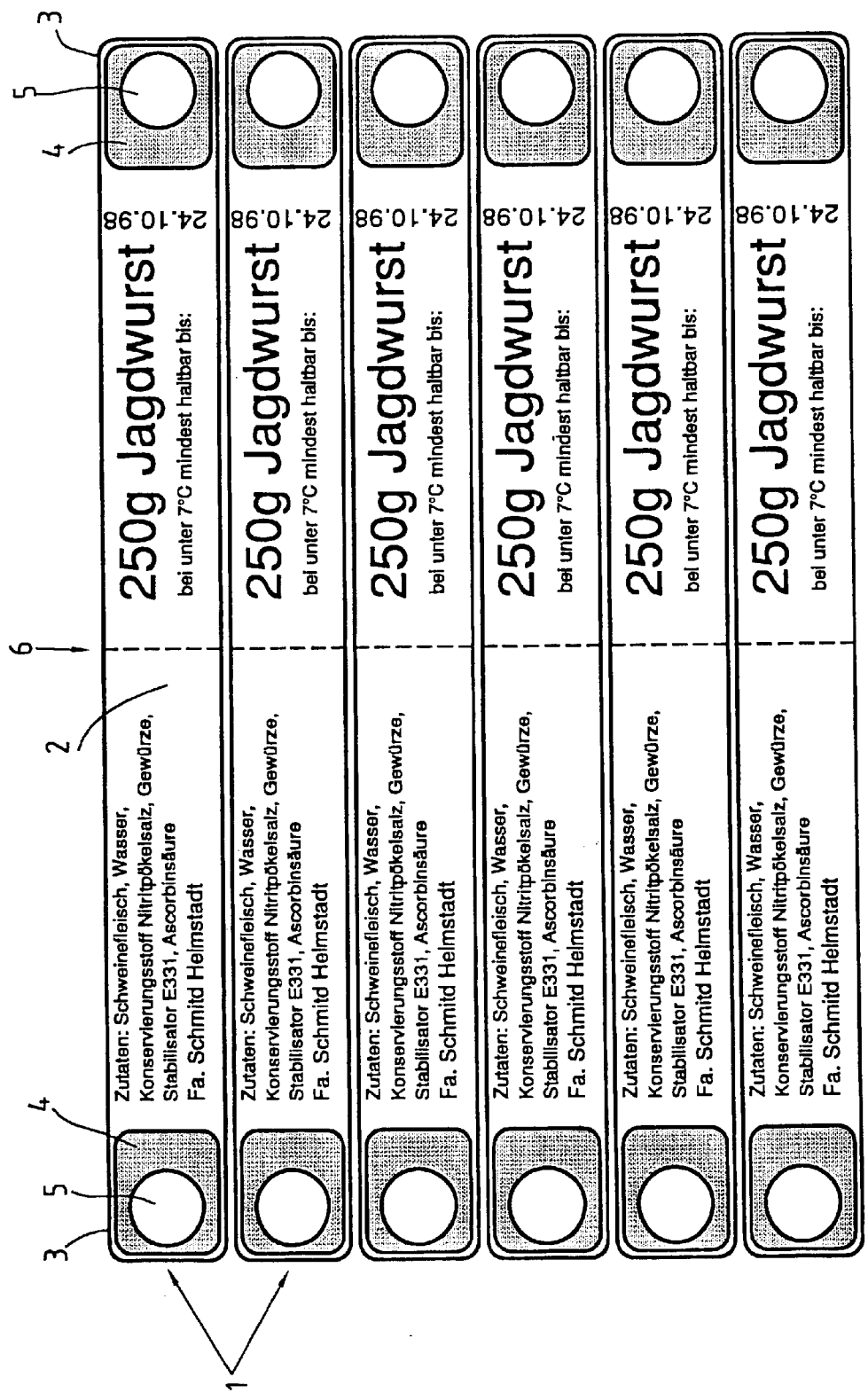
FIG. 1 on an enlarged scale, shows a plurality of inventive "label loops" in magazined form.

The strip 2 can be magazined in its longitudinal direction (roll material in strip width). FIG. 1 illustrates an alternative, in which a support tape (not shown) of a width, corresponding to the length of the strip, takes up the strips 2 next to one another. The support tape can also be reduced to two narrow tapes of a width, corresponding to the respective region 4; in that case, the tapes can form the (permanent) reinforcement of the region 4.

What is claimed is:

1. A method for providing the end of a sausage with a suspension loop which comprises providing a strip of tape material having two ends, with a hole at each of said two ends, folding said strip over upon itself to superimpose said holes upon each other, engaging said superimposed holes with a sealing element, and sealing the end of said sausage with said sealing element.

2. The method of claim 1, wherein said sealing element is a sealing clip having two legs, said sealing clip is engaged with said superimposed holes by passing one leg of said clip through said superimposed holes, and said end of said sausage is sealed by closing said sealing clip around said end of said sausage.

3. The method of claim 1, wherein the tape material is compose of a printable plastic.

4. The method of claim 3, wherein the tape material is constructed as a multilayer composite film.

5. The method of claim 1, wherein the strip is reinforced at least in the regions surrounding the holes.

6. The method of claim 1, wherein at least one of the surfaces which face one another in the folded-over strip in the region surrounding the holes, is coated with a pressure-sensitive adhesive.

7. A sausage having a suspension loop comprised of a folded-over strip of tape material, both ends of said tape material being provided with a hole, which holes are superimposed upon each other in the folded-over strip, with one end of said sausage being gathered Into a neck and sealed by a sealing element which surrounds the gathered neck and passes through said superimposed holes of said folded over strip, therby attaching said suspension loop to said sausage.

8. The seal of claim 1, wherein the tape material is compose of a printable plastic.

9. The seal of claim 1, wherein the tape material is composed of a printable plastic.

10. The seal of claim 1, wherein the tape material is composed of a printable plastic.

11. The seal of claim 1, wherein the tape material is composed of a printable plastic.

* * * * *